Jan. 7, 1947.  F. VAN ARSDELL  2,414,005
FRICTIONAL MECHANISM AND EXPANDER THEREFOR
Filed Oct. 2, 1944

Inventor
Fred VanArsdell

Patented Jan. 7, 1947

2,414,005

UNITED STATES PATENT OFFICE 2,414,005

FRICTIONAL MECHANISM AND EXPANDER THEREFOR

Fred Van Arsdell, Cuyahoga Falls, Ohio, assignor to The B. F. Goodrich Company, New York, N. Y., a corporation of New York Application October 2, 1944, Serial No. 556,806

6 Claims. (Cl. 188—152)

This invention relates to frictional mechanism and especially to expanders for expander-operated brakes, and is especially useful in the construction of brakes for aircraft, although features of the invention are useful also in other frictionally-operable structures, such as clutches and brakes for other purposes.

Objects of the invention are to provide a multi-stage expander capable of a high degree of lift movement, to provide effective strength and high lift without destructive hinging action, to provide an outwardly expansible brake expander with a plurality of independently inflatable chambers, to provide for independently operating chambers of a multiple chamber expander from opposite ends thereof.

These and other objects will appear from the following description and the accompanying drawing.

Figure 1:
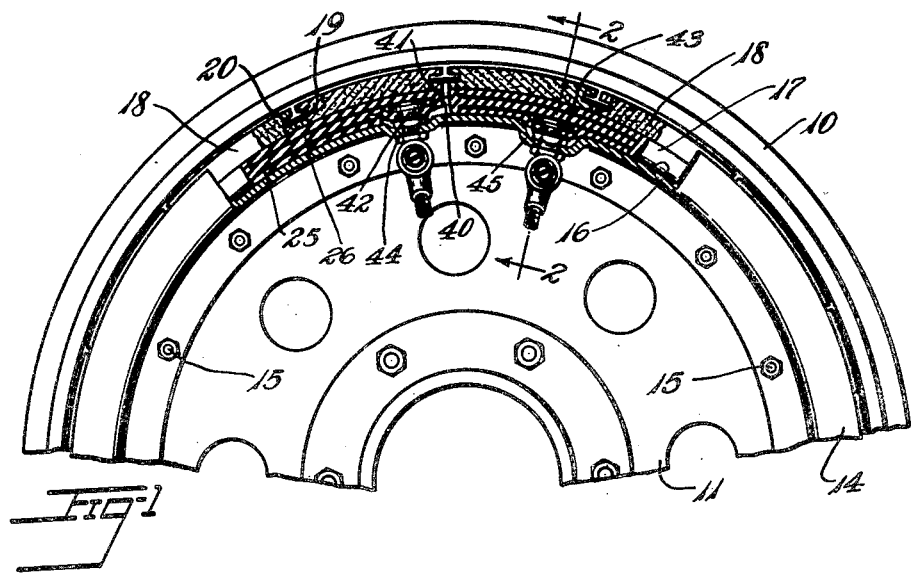
Fig. 1 is a side view of a brake partially broken away and partly in section having an expander constructed in accordance with and embodying the invention.
Figure 2:
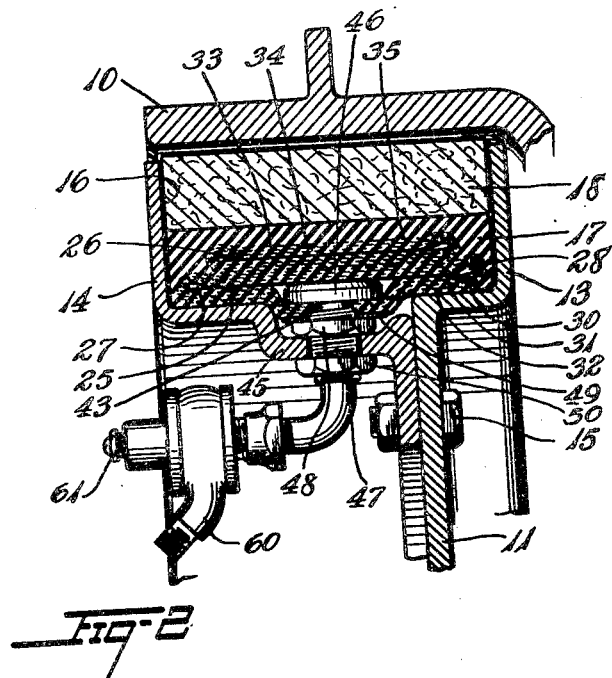
Fig. 2 is a cross-section thereof taken on line 2—2 of Fig. 1.

Referring to the drawing, the numeral 10 designates a rotatable brake drum and the numeral 11 a torque member for supporting a brake structure for cooperation therewith. The torque member has a fixed offset flange 13 at its periphery and a removable offset flange 14 is secured thereto, as by bolts 15 to provide an outwardly-facing channel 16. Seated in the channel is an expander 17. Upon the face of the expander is a series of brake shoes 18 in position to engage the brake drum 10. The shoes are grooved at their meeting margins, as at 19 to receive retractor springs 20. The ends of the springs may engage the flanges 13, 14 as for example in the manner shown in the Hunter Patent 2,174,724, and the springs are bowed inwardly to press the brake shoes toward the expander. The brake shoes are of heat-resisting friction material such as brake lining composition.

The expander, which is preferably of rubber or other rubber-like material, is substantially rectangular in cross section so as to fill the channel space beneath the shoes and is preferably of discontinuous arcuate form. A pair of superimposed expansion passages or chambers 25, 26 is formed in the expander and these extend substantially throughout its length. Each chamber extends laterally across the expander with the inner and outer walls of the chamber substantially in contact in the unexpanded position of the expander, the margins 27, 28 of the chamber being preferably turned outwardly in a radial direction and being more open to avoid sharp hinging action during inflation. Hinging action at the margins is rendered less severe also by forming the radially outer chamber of lesser width than the radially inner chamber so that flexure at the margins of the respective chambers can be effected with a minimum of interference of one with the other.

To provide strength to resist bursting under high pressure while nevertheless facilitating the radially outward expansion, each chamber is surrounded by reinforcing material which may be respective layers 30, 31, 32 and 33, 34, 35 of thin square woven fabric having equal strength in two directions and bias laid so that its warp and filler threads extend diagonally of the expander. These plies of fabric are embedded in and are united to the rubber-like material of the body by the molding and vulcanizing operation in forming the expander.

The expander extends about the channel 16 with its closed ends 40, 41 in close proximity. Near the ends of the expander, metallic pipe connections 42, 43 are provided and the channel is formed with apertures surrounded by depressions 44, 45 for clearing the connections. Each connection has an enlarged head, such as 46 adapted to be received in the expander chamber, and is threaded, as at 47, to receive a nut 48 adapted to clamp a washer 49 against the wall of the expander. The arrangement is such that the expander wall is clamped between the head 46 and the washer 49 to seal the opening. A second nut 50 engages the same thread and clamps the expander to the channel. Connection 42 communicates with chamber 26 which at end 40 of the expander extends beyond chamber 25, and connection 43 communicates with chamber 26 at the opposite end 41 of the expander. Each metallic connection may be of L shape, as shown, and connection thereto may be made from a source of fluid pressure by a swivel connection 60. A bleeder 61 may be provided to remove air from the system. The fluid connections at opposite ends of the expander serve the purpose of anchoring the ends of the expander while also preventing congestion of space by distributing the connections at different positions along the channel.

The construction of the expander is such that it may be built in straight form and then be vulcanized in arcuate form if desired or in flat form and then wound about the channel.

The arrangement of a plurality of expander chambers in superimposed relation permits operation of a single expander from two pressure-fluid systems and, if desired, at different fluid pressures.

For example, one chamber may be operated by fluid pressure from a service brake and the other chamber may be operated from an emergency brake. In another use of the fluid system the chamber 26 may be connected to a source of fluid pressure for braking purposes while the chamber 25 may be connected to the same source of pressure or a different source controlled by a shut-off valve and used for adjusting the non-braking position of the shoes. Such an arrangement is of advantage in keeping the amount of lift of the shoes low regardless of their condition due to wear and is of especial advantage where the brake is to be operated by a foot-actuated pressure cylinder as on light planes not equipped with powerful hydraulic pressure systems. In a further alternative manner of use, both chambers may be simultaneously inflated for obtaining a high degree of lift of the brake shoes and then simultaneously deflated, this being advantageous, for example, in cases where close clearances are not desired in the retracted condition of the brake.

Variations may be made without departing from the scope of the invention as it is defined by the following claims.

I claim:

1. An expander for a frictional mechanism comprising a body of rubber-like material having circumferentially extending radially inner and outer faces and having radially superimposed chambers in said body between said faces thereof, means for conducting activating fluid to said chambers, flexible reinforcing material in said body extending about one of said chambers only, and additional flexible reinforcing material in said body extending about the other only of said chambers, the individual reinforcements providing substantial independency of restraining action of the reinforcements under individual expansion of the chambers.

2. An expander for a frictional mechanism comprising a body of rubber-like material having circumferentially extending radially inner and outer faces and having radially superimposed chambers in said body between said faces thereof, the radially inner of said chambers being relatively of greater width than the radially outer of said chambers with the margins of the inner chamber extending laterally beyond the margins of the outer chamber, means for conducting actuating fluid to said chambers, flexible reinforcing material in said body extending about the wider inner chamber only, and additional flexible reinforcing material in said body extending about the narrower outer chamber only, the individual reinforcements providing substantial independency of restraining action of the reinforcements under individual expansion of the chambers.

3. An expander for a frictional mechanism comprising an annular body of rubber-like material having a pair of ends, said body having circumferentially extending radially inner and outer faces and having radially superimposed chambers in said body between said faces thereof and terminating adjacent the ends of said body, means at an end of said body for conducting actuating fluid to one of said chambers, means at the other end of said body for conducting actuating fluid to the other of said chambers, flexible reinforcing material in said body extending about one of said chambers only, and additional flexible reinforcing material in said body extending about the other only of said chambers, the individual reinforcements providing substantial independency of restraining action of the reinforcements under individual expansion of the chambers.

4. In a frictional mechanism having relatively rotatable radially nested members and a friction element carried by the radially inner of said members, an expander radially within said element for moving said element into engagement with the radially outer member, said expander comprising a body of rubber-like material having circumferentially extending radially inner and outer faces and having radially superimposed chambers in said body between said faces thereof, means for conducting actuating fluid to said chambers, flexible reinforcing material in said body extending about one of said chambers only, an additional flexible reinforcing material in said body extending about the other only of said chambers, the individual reinforcements providing substantial independency of restraining action of the reinforcements under individual expansion of the chambers.

5. In a frictional mechanism having relatively rotatable radially nested members and a frictional element carried by the radially inner of said members, an expander radially within said element for moving said element into engagement with the radially outer member, said expander comprising a body of rubber-like material having circumferentially extending radially inner and outer faces and having radially superimposed chambers in said body between said faces thereof, said outer chamber being relatively of less width than said inner chamber with the margins of the inner chamber extending laterally beyond the outer chamber, means for conducting actuating fluid to said chambers, flexible reinforcing material in said body extending about the wider inner chamber only, and additional flexible reinforcing material in said body extending about the narrower outer chamber only, the individual reinforcements providing substantial independency of restraining action of the reinforcements under individual expansion of the chambers.

6. In a frictional mechanism having relatively rotatable radially nested members and a frictional element carried by the radially inner of said members, an expander radially within said element for moving said element into engagement with the radially outer member, said expander comprising an annular body of rubber-like material having a pair of ends positioned closely adjacent to each other, said body having circumferentially extending radially inner and outer faces and having radially superimposed chambers in said body between said faces thereof, means at one of the ends of said body for conducting actuating fluid to one of said chambers, said means being mounted to anchor said body to the radially inner member, means at the other end of said body for conducting actuating fluid to the other of said chambers, the last said means being mounted to anchor said body to the radially inner member at said other end of said body, flexible reinforcing material in said body extending about one of said chambers only, and additional flexible reinforcing material in said body extending about the other only of said chambers, the individual reinforcements providing substantial independency of restraining action of the reinforcements under individual expansion of the chambers.

FRED VAN ARSDELL.